United States Patent
Blas et al.

(10) Patent No.: US 10,453,240 B2
(45) Date of Patent: Oct. 22, 2019

(54) METHOD FOR DISPLAYING AND ANIMATING SECTIONED CONTENT THAT RETAINS FIDELITY ACROSS DESKTOP AND MOBILE DEVICES

(71) Applicant: ADOBE INC., San Jose, CA (US)

(72) Inventors: Joaquin Cruz Blas, Pacifica, CA (US); Jorge Kent Taylor, Burlingame, CA (US)

(73) Assignee: ADOBE INC., San Jose, CA (US)

( * ) Notice: Subject to any disclaimer, the term of this patent is extended or adjusted under 35 U.S.C. 154(b) by 133 days.

(21) Appl. No.: 14/933,828

(22) Filed: Nov. 5, 2015

(65) Prior Publication Data

US 2017/0132829 A1    May 11, 2017

(51) Int. Cl.
*G06T 13/80* (2011.01)
*G06F 3/0485* (2013.01)

(52) U.S. Cl.
CPC .......... *G06T 13/80* (2013.01); *G06F 3/0485* (2013.01)

(58) Field of Classification Search
CPC .............. G06F 3/0485; G06F 17/3089; G06F 17/30994; G06F 17/30058; G06F 17/30716; G06T 1/60
See application file for complete search history.

(56) References Cited

U.S. PATENT DOCUMENTS

| | | | | |
|---|---|---|---|---|
| 9,141,402 B2* | 9/2015 | Hewitt | .................. | G06F 3/0482 |
| 9,361,130 B2* | 6/2016 | SanGiovanni | ........ | G06F 9/4443 |
| 9,858,969 B2* | 1/2018 | Khan | .................. | G11B 27/105 |
| 2004/0217980 A1* | 11/2004 | Radburn | ............. | G06F 17/3028 345/672 |
| 2005/0053359 A1* | 3/2005 | Jung | .................... | G11B 27/105 386/234 |
| 2006/0010246 A1* | 1/2006 | Schulz | ................. | G06F 3/04847 709/232 |
| 2011/0202837 A1* | 8/2011 | Fong | ..................... | G06F 3/0485 715/702 |
| 2011/0225547 A1* | 9/2011 | Fong | ................... | G06F 3/04817 715/835 |
| 2012/0056889 A1* | 3/2012 | Carter | ..................... | G06T 13/00 345/473 |
| 2012/0137308 A1* | 5/2012 | Agarwal | ........... | G06F 17/30994 719/318 |
| 2013/0176316 A1* | 7/2013 | Bates | ..................... | G06T 13/80 345/474 |

(Continued)

*Primary Examiner* — Jeffrey J Chow
(74) *Attorney, Agent, or Firm* — Shook Hardy & Bacon L.L.P.

(57) ABSTRACT

Embodiments of the present invention facilitate displaying and animating sectioned content that retains fidelity across desktop and mobile devices. An animation timeline is identified for an article comprising one or more sections. The animation timeline enables the article to appear to a user as a webpage. When a user manipulates the viewport, the animation timeline manages content movement in and out of the viewport. For articles comprising more than one section, an internal timeline may be created for each section and initialized when each article starts to enter the viewport. As articles are loaded into memory, they become visible in the viewport and behaviors may be attached to each section. In this way, memory is preserved and the document can be rendered in full fidelity across any device.

20 Claims, 11 Drawing Sheets

(56) References Cited

U.S. PATENT DOCUMENTS

Figure 1:
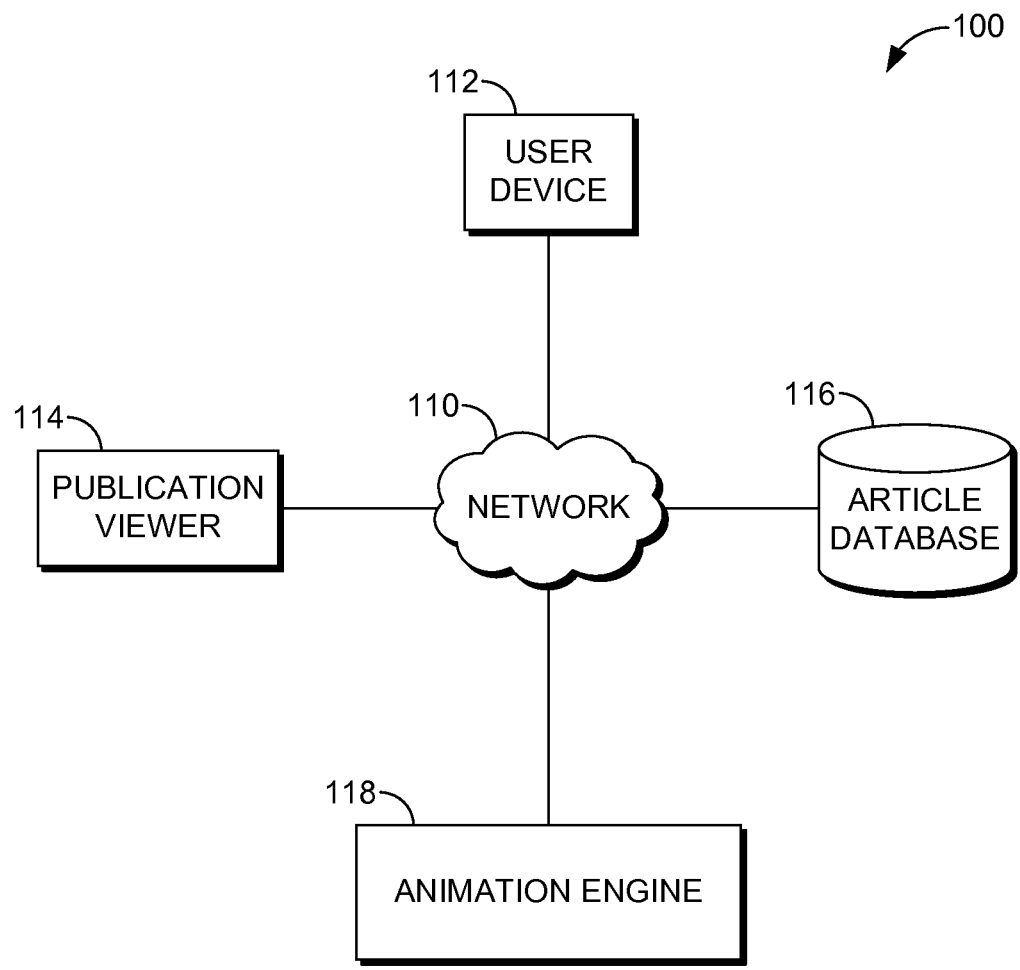

| | | | |
|---|---|---|---|
| 2013/0222395 A1* | 8/2013 | Blas, Jr. | G06T 13/80 345/473 |
| 2014/0071074 A1* | 3/2014 | Cousins | G06F 3/0485 345/173 |
| 2014/0229818 A1* | 8/2014 | Goswami | G06F 17/2247 715/234 |
| 2015/0095839 A1* | 4/2015 | Hombert | G11B 27/34 715/781 |
| 2015/0243257 A1* | 8/2015 | Witman | G06T 1/20 345/522 |
| 2016/0012018 A1* | 1/2016 | Do Ba | H04L 12/6418 715/234 |
| 2016/0070434 A1* | 3/2016 | Clark | G06F 3/04812 715/762 |
| 2016/0231894 A1* | 8/2016 | Ying | G06F 3/0485 |
| 2017/0017616 A1* | 1/2017 | Elings | G06F 17/212 |
| 2017/0024098 A1* | 1/2017 | Doherty | G06F 3/0485 |
| 2018/0011580 A1* | 1/2018 | Lebowitz | G06F 3/0414 |

\* cited by examiner

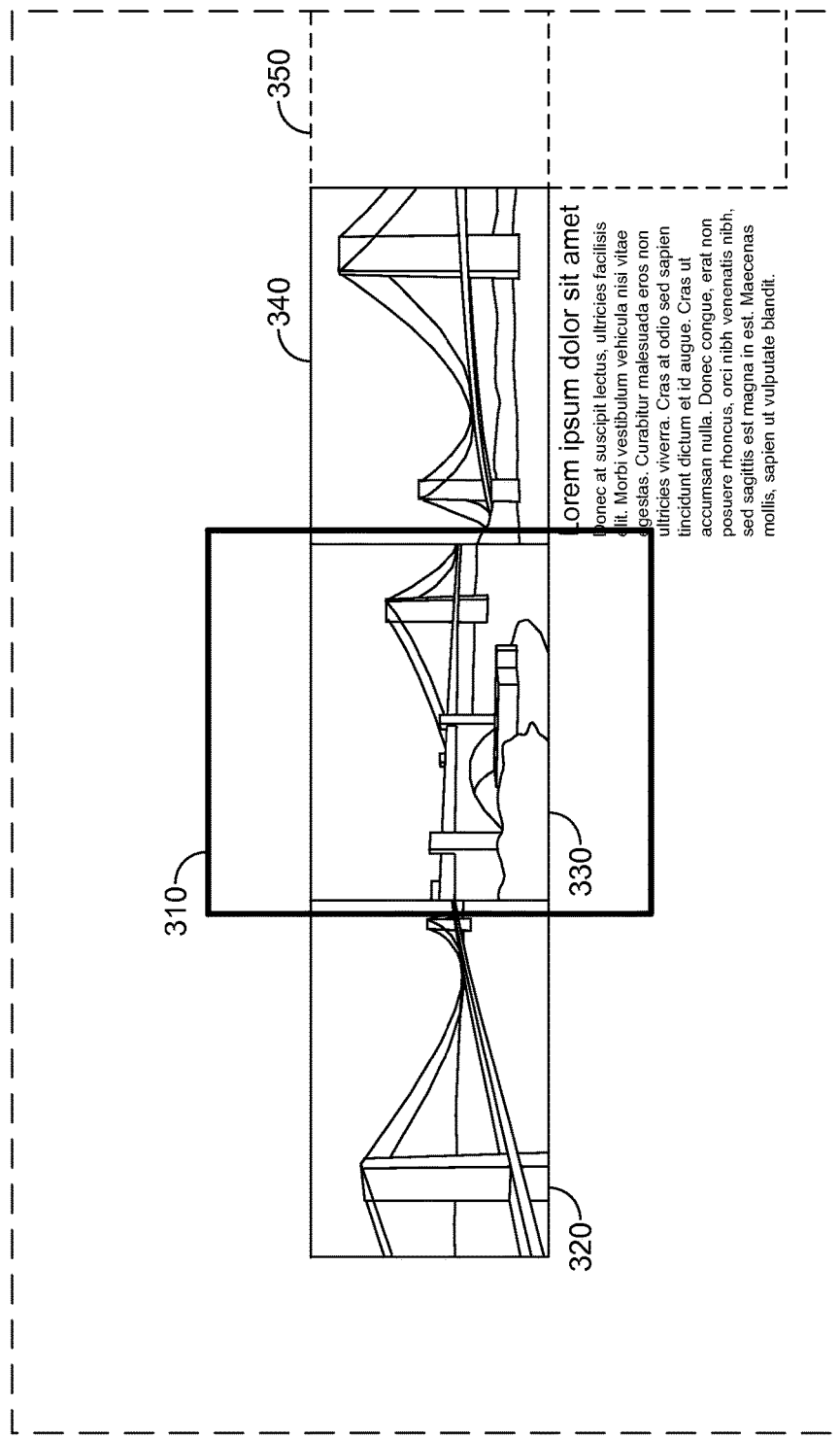

METHOD FOR DISPLAYING AND ANIMATING SECTIONED CONTENT THAT RETAINS FIDELITY ACROSS DESKTOP AND MOBILE DEVICES

BACKGROUND

The World Wide Web has enabled a vast collection of articles to be accessible to many users via the Internet. Using a web browser, users can view these articles that may contain text, images, videos, and other forms of multimedia. Depending on the type of devices accessing these articles, the rendering of content within the articles can vary. This results in a delay ranging from a few milliseconds (i.e., on a desktop or notebook) to several seconds (i.e., on a mobile device or tablet) before the content associated with the article is rendered. Each time a user scrolls to view additional content associated with the article, the delay is repeated. During this delay, the user may see the article or content rendered progressively, which often causes the article or content to appear broken until it is fully loaded or the user may not see the article or content rendered at all until the user stops scrolling. In some instances, the memory required to render certain articles or content within the articles exceeds the available memory of the device which causes the rendering application to crash. These delays and crashes can frustrate users, often leading to a bad user experience or causing the user to give up altogether and seek a similar article or content from another source. Accordingly, to prevent these delays and crashes, content is often provided at different levels of fidelity or in completely different formats to different devices.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention generally relate to displaying and animating sectioned content that retains fidelity across desktop and mobile devices. More particularly, some embodiments are directed to creating an animation timeline for each article comprising one or more sections. The animation timeline enables the articles to appear as webpages to the user viewing the articles. When a user manipulates the viewport, the animation timeline manages content movement in and out of the viewport. For articles comprising more than one section, an internal timeline that manages content movement inside each section may be created for each section and placed inside the animation timeline. As articles are loaded into memory, they become visible in the viewport and a behavior is attached to each section. This enables memory of the device to be preserved and allows each article to be rendered in full fidelity across any device.

BRIEF DESCRIPTION OF THE DRAWINGS

The present invention is described in detail below with reference to the attached drawing figures, wherein:

FIG. 1 is a block diagram showing a system for displaying and animating sectioned content that retains fidelity across desktop and mobile devices in accordance with an embodiment of the present invention;

FIGS. 2A-2B are exemplary screen shots that illustrate displaying and animating sectioned content that retains fidelity across desktop and mobile devices in accordance with embodiments of the present invention;

FIGS. 3A-3E are exemplary screen shots that illustrate displaying and animating sectioned content that retains fidelity across desktop and mobile devices in accordance with embodiments of the present invention;

FIG. 4 is a flow diagram for displaying and animating sectioned content that retains fidelity across desktop and mobile devices in accordance with an embodiment of the present invention;

FIG. 5 is a flow diagram showing a method displaying and animating sectioned content that retains fidelity across desktop and mobile devices in accordance with an embodiment of the present invention; and FIG. 6 is a block diagram of an exemplary computing environment suitable for use in implementing embodiments of the present invention.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As used herein, a "Slate" refers to a HyperText Markup Language (HTML) document produced by the ADOBE Slate application that serves as a container for one or more articles. When displayed within a browser or WebView, users can navigate between articles by swiping horizontally (left or right) or using the left or right navigation arrow. An "article" is a collection of related content that is suitable for the World Wide Web and can be rendered by a web browser or WebView. A web browser or WebView displays the article via a monitor or a mobile device in an area of the display referred to as a "viewport." To view the content of an article, users can swipe vertically (e.g., up or down).

The article may comprise HTML, cascading style sheets (CSS), and JavaScript (JS) that are utilized by the web browser to present the page. CSS refers to a style sheet language that is utilized to describe the look and formatting of a document written in a markup language. HTML refers to the standard markup language used to create web pages. A web browser is able to read HTML files and render them as visible or audible web pages. HTML allows images, objects, or scripts to be embedded and can be used to create structured documents and interactive forms. HTML may further refer to CSS to define the look and layout of the page. Multiple HTML pages may share formatting by pointing to the relevant CSS stored in a separate .css file. Elements such as layout, colors, and fonts may be defined by the CSS. JS refers to a computer programming language used by web browsers to allow client-side scripts to interact with the user, control the browser, and alter document content that is displayed.

A "sections article" is a particular type of Slate article that maintains a set of content sections. The main responsibility of the sections article is to sequence and display the sections within the article at the appropriate time. A "section" refers to the logical units that the content within a sections article is split into. Each section is responsible for the display and behavior of the content it contains.

The term "behaviors" refers to patterns associated with a template used to design an article or a section of an article that has a predefined configuration or can perform predefined functions. Users select behaviors when creating a slate document. For example, a table of contents behavior provides a list of one or more articles and enables the article that is selected to be loaded into the viewport. A 50/50 behavior is an article with text on the left side and one or more images on the right side. Behaviors are not attached to an article until the article is loaded into memory. Other behaviors may include zooming in or out, fading in or out, and the like. Each section of an article may have its own behavior. For example, the title section of an article may have a different behavior than the rest of the article.

As discussed previously, users view articles, via a web browser or view port, containing text, images, videos, and other forms of multimedia. Depending on the type of devices accessing these articles, the rendering of content within the articles can vary. Delays ranging from a few milliseconds (i.e., on a desktop or notebook) to several seconds (i.e., on a mobile device or tablet) before the content associated with the article is rendered. Each time a user scrolls to view additional content associated with the article, more delay is experienced. In many instances, the user sees the article or content rendered progressively, which causes the article or content to appear broken until it is fully rendered. In other instances, the user does not see the article or content rendered at all until the user stops scrolling. In extreme cases, the web browser or view port crashes due to lack of memory. These delays and crashes lead to a bad user experience or cause the user to give up altogether and seek a similar article or content from another source. To prevent these delays and crashes, content is often provided at different levels of fidelity or in completely different formats to different devices.

Some embodiments of the present invention are directed to displaying and animating sectioned content that retains fidelity across desktop and mobile devices. As such, upon receiving a request for an article comprising one or more sections, an animation timeline is identified for the article. When a manipulation to the viewport is received, the animation timeline is utilized to manage content movement in and out of the viewport. In this way, the animation timeline (or internal timeline described below) manages when the content inside an article becomes visible and how it becomes visible. The timelines may also trigger behaviors on the content or section itself at specific times within an internal timeline. Each of these behaviors reacts to user initiated events (interactions) and may be created or enabled prior to an article or section becoming visible. In some embodiments, some articles or sections have behavior triggers on the timeline that adjust the visibility or availability of content within an article or section as it moves in and out of the viewport. Each of these behaviors facilitates more efficient management of memory.

In some embodiments (e.g., a sections article), each section in the one or more articles and an internal timeline is identified for each section. In some embodiments, the internal timeline is placed inside the timeline at the time the document is created. As can be appreciated, this provides a user creating the article feedback of how each section appears to a viewer within the context of the overall article timeline (i.e., the "play" time of the article and each section of the article). In some embodiments, the internal timeline is placed inside the animation timeline dynamically when each section starts to enter the viewport. In some embodiments, the section timelines are used in place of an animation timeline (i.e., each section's internal timeline drives the display of each section and each of these are identified rather than identifying an overall article animation timeline).

As the viewport is manipulated the articles that are loaded into memory is changed. For example, a maximum of three articles may be loaded at a time (the current article in the viewport, and the article on either side of the current article). As the viewport is manipulated horizontally, the user switches between articles. Articles that are off-screen are hidden to save memory and improve rendering performance. Also, manipulating the viewport vertically has a similar effect of switching between the sections within the current article.

Referring now to FIG. 1, a block diagram is provided that illustrates an animation system 100 for displaying and animating sectioned content that retains fidelity across desktop and mobile devices in accordance with embodiments of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The animation system 100 generally operates to provide content to a user via a web browser or viewport that retains full fidelity regardless of the device type utilized by the user. To do so, an animation timeline is identified for each article comprising one or more sections. Each article may be a sections article, which enables content to be divided into sections that can be presented in different ways (i.e., with different behaviors attached to each section). As described above, in various embodiments, each section may include its own section timeline which can be placed inside the animation timeline during article creation, placed inside the animation timeline dynamically as each section enters the viewport, or identified and used in place of the animation timeline. Animation is used to display the content within each section which is accomplished through the use of CSS transitions and/or keyframe-animations and JS which adjusts the transforms, opacity, color, and various other properties of the content within the article dynamically as the user scrolls vertically. Although the term scrolling is utilized in connection with the animation system 100, scrolling is actually an illusion to the viewer. Instead, the viewer is actually scrubbing vertically through an article's timeline which can be accomplished by various means, including touch gestures (swiping vertically), mouse wheel, or by using the faux scrollbar (scrubber) that is rendered when an interaction with the article is detected. In this way, the timeline is not tied to the existence of a native scrollbar or native scrolling mechanism. Rather, content is being manually moved via CSS properties which enable updates to the screen while scrolling. At the same time, memory can be managed by turning on or off the display of content at the appropriate times. This enables a given Slate to display and animate with the same fidelity no matter what platform or device it is displayed on. Among other components not shown, the system 100 may include a user device 112, a publication viewer 114, an article database 116, and an animation engine 118.

It should be understood that the system 100 shown in FIG. 1 is an example of one suitable computing system architecture. Each of the components shown in FIG. 1 may be implemented via any type of computing device, such as computing device 500 described with reference to FIG. 5, for example. The components may communicate with each other via a network 110, which may include, without limitation, one or more local area networks (LANs) and/or wide area networks (WANs). Such networking environments are commonplace in offices, enterprise-wide computer networks, intranets, and the Internet.

It should be understood that any number of user devices, publication viewers, animation engines, article databases, and networks may be employed within the system 100 within the scope of the present invention. Each may comprise a single device or multiple devices cooperating in a distributed environment. For instance, the animation engine 118 may be provided via multiple devices arranged in a distributed environment that collectively provide the functionality described herein. In another instance, portions of the animation engine 118 may be provided by the user device 112, the publication viewer 114, or as a web service provided in the cloud. Similarly, portions of the animation engine 118 may be provided by each of the user device 112, the publication viewer 114, and as a web service provided in the cloud. In some embodiments, the publication viewer 114 and the animation engine 118 may be provided by a single device. Additionally, other components not shown may also be included within the network environment.

As shown in FIG. 1, the animation system 100 includes a user device 112, a publication viewer 114, an article database 116, and an animation engine 118. The user device 112 may initially access one or more articles stored within the article database 116. Each article may include animations that are triggered whenever the content being animated enters or exits and or moves through the viewport. There are two basic types of animations: triggered animations and scrubbed animations. Triggered animations are kicked off as soon as the elements being animated enter or exit the viewport or cross some threshold on screen. The user has no control over how fast or slow the animations execute, only when they are triggered as part of scrolling through the article. In contrast, for scrubbed animations, each frame of the animation is controlled by how fast or slow the user scrolls the article. The user may be able to see each frame of a scrubbed animation, or stop scrolling while in the midst of a scrubbed animation.

The publication viewer 114 enables vertical scrolling which provides for the navigation of content for an article. However, some mobile browsers do not fire scroll events at the same rate, or even at all, while the user is drag-scrolling. Additionally, many mobile browsers do not fire scroll events while the user is momentum-scrolling (e.g., as the result of a user flicking the content on screen). In current systems, these events are necessary to know how far into the document the user has scrolled or to determine what content should be in the viewport. Moreover, in some of these mobile-based browsers, what is actually scrolled is a cached version (i.e., a bitmap) of the content, so any screen updating that happens while in the midst of a scroll event, does not show up until the user lifts up his finger (after a drag-scroll) or momentum-scrolling has stopped.

To overcome this, the publication viewer 114 utilizes "faux scrolling." Instead of using libraries such as iScroll, which listen for touch events and use CSS transforms to move a specific element through the viewport, the publication viewer 114 separates out the detection for the gesture (i.e., for drag-scrolling or momentum-scrolling) and the animation engine 118 utilizes an animation timeline to manage and choreograph all content movement on screen. In this way, the animation engine 118 equates a pixel-length with a millisecond in the timeline.

As the user makes a gesture for scrolling, the distance in pixels the gesture traveled can be mapped by the animation engine 118 to the number of milliseconds that should be played in the timeline. Tweens and/or triggers are placed by the animation engine 118 at the appropriate offsets in the timeline to animate elements via CSS transforms (and other properties), or classes may be placed on the elements to trigger CSS transitions/key-frame animations. This enables multiple advantages. First, it frees the publication viewer 114 from being tied to the physical height of the article. In this way, the article is as long as the timeline duration. It also allows the state and movement or animation of any sections or elements within the article, at any given time, to be synchronized without having to constantly measure elements or figure out where they are relative to the viewport during each scroll event. Additionally, the screen can update dynamically even in the midst of momentum-scrolling or drag-scrolling. Finally, the publication viewer 114 is not tied to vertical scrolling between sections of content. Sections can utilize fades, horizontal, and three-dimensional movement.

CSS transforms are utilized, in some embodiments, by the animation engine 118 to take advantage of GPU rendering on mobile devices, which results in smoother animations. However, this speed advantage can be negated if the layout size of the element being transformed is greater than 1024 pixels in any of its dimensions. This results in the element being rendered to be split across several tiles (of max dimension 512 pixels). Since a full rendering pass is done for each tile any time that element is re-rendered, any speed gain is lost.

For an article that has a lot of content sections, avoiding this tile-rendering limit is difficult if the sections are flowed one after the other because the body expands to encompass all of the content it contains. To avoid this situation, the publication viewer 114 limits the height of each section and all of its parent elements, up to and including the body element, so that they never exceed the height of the viewport and never show any content that hangs outside of them. The publication viewer 114 then absolutely positions all sections on top of each other so the body of the article never has a height greater than the viewport. The animation engine 118 then adds the appropriate CSS transforms/tweens to the timeline to move the section off-screen and out of view (just below the fold). Each section is then moved by the animation engine 118 upwards through the viewport, at the appropriate time, giving the illusion of scrolling content that appears as if it was statically laid out.

The publication viewer 114 also can make use of large background images and/or photos. These are normally problematic on mobile devices, especially iOS devices, if they exceed 1024 pixels in any dimension. Transforming and moving images with dimensions larger than 1024 pixels in any dimension causes transform animations to stutter. For this reason, the publication viewer 114 loads images that are a maximum of 1024 pixels in dimension by default. If the publication viewer 114 detects that any sections are larger than this dimension, the publication viewer 114 assumes it is loaded within a desktop browser and attempts to load higher-resolution images that may exceed 1024 pixels in dimension.

In embodiments, the animation engine 118 also manages the content in each section. This includes determining when each element inside the section animates. In general, an element inside the section does not animate unless the section is, at a minimum, partially visible within the viewport. This rule can be enforced by the animation engine 118 because each section includes its own internal timeline. The internal timeline is responsible for animating the content inside the section and is placed in the article timeline at the point in time when the section starts to enter the viewport. This nested section timeline can also be used to bring content into the section viewport at the appropriate time just like the article timeline brings sections into view at the appropriate time further extending the illusion of statically laid out content. Compartmentalizing the animations and tweens/triggers for a given section in its own nested timeline also has the side effect of decreasing the number of timeline objects the article timeline must sort through each timeline frame when it determines what objects should actually execute at that given moment, which results in improved performance.

Use of CSS transforms may result in large amounts of memory being allocated by the browser for caching and fast rendering of the transformed element. On mobile devices with limited memory, this can be problematic and may cause the browser to crash. To avoid crashes, the animation engine 118 places hide/show triggers in the article timeline at the appropriate time (e.g., based on the article, or section, being inside the viewport). This enables articles or sections that are outside of the viewport to release their cached resources. The animation engine 118 accomplishes this by setting CSS properties to release cached resources. Because each section has its own internal timeline, behaviors of individual sections may cause content (i.e., full width/full screen images and photo grids) to be divided into chunks so triggers can be used to hide/show them depending on whether a particular chunk is inside or outside the viewport allowing more memory to be freed for the device.

In some instances, this hiding/showing results in a slight delay as the section's visibility is toggled by the publication viewer 114 from hidden to shown as it enters the viewport during scrolling. This is caused by the browser rebuilding its off-screen buffers for each image that will be rendered. For sections containing single images, this delay is almost unperceivable. But, for sections like photo grids that contain multiple images, the delay may be noticeable. The greater the number of images in the grid, the longer the hiccup. The publication viewer 114 strikes a balance between preserving memory and lessening long delays. For large photo grids, the photo grid section may resort to hiding/showing individual rows (or groups of rows) of the photo grid, as needed, via the internal timeline. So, instead of the user experiencing one long delay, the user may experience smaller, unperceivable, delays as each row comes into view. Or, rather than managing hide/show at the row level, the publication viewer 114 may choose to not hide any of the grid images at all if the size of the images within the article falls within an acceptable memory usage threshold.

In an exemplary embodiment, the publication viewer 114 identifies all of the articles within a Slate document when a browser loads a shared link. The visibility of each article, based on a user interaction, is also managed by the publication viewer. Three articles at a time are visible (i.e., loaded into memory). Initially when the first article is shown (or made the current article) there are only two articles visible since no article precedes the first article. The publication viewer 114 further identifies the type of article so that it can be initialized properly. Each article can have different behaviors associated with them. For example, the sections article behavior includes scrolling/animation to provide the appearance of scrolling between sections of the article. Each article type may include a handler associated with it, in an article handler registry. When it is time to initialize an article, the publication viewer 114 looks up the handler for a given article based on its article type. If there is a handler defined for that type, the publication viewer 114 invokes the handler that is responsible for initializing the article to activate/setup all of its behaviors and prepare the content within it. For the sake of preserving memory and initialization time, the publication viewer 114 delays invoking the initialization handler for a given article until the article is made visible (i.e., either made the current article immediately preceding or following the current article). The other reason this is necessary is because the article behaviors may also require geometric dimensions of the content within the article which may only be available if the article is visible (either current or immediately preceding or following). With respect to the sections article handler, an internal timeline is created to manage when sections come into and out of view, etc. The sections article handler also has some behaviors that are similar to the publication viewer 114. For example, it identifies the sections within the article, and based on the type of the section, an initialization handler is invoked for that section based on handlers registered in a sections registry. These section handlers define the behaviors and animations used within a particular section, and the handlers are also responsible for adding internal section animations/behaviors to the article timeline. However, unlike with the article handle, the section handler initializes all sections of the article at once so the article handler can get a complete picture of all the sections, their internal timelines, etc., that the article handler must manage and synchronize together to perform the expected behaviors. Also, viewport resizing may cause reinitialization to be necessary. For example, if the user rotates the device the article is being viewed on or the user resizes the browser window (i.e., on a desktop), the sections article handler performs a re-initialization of the article because the geometry of the content may have changed, so the timeline and all other animations/behaviors need to be changed accordingly.

Figure 2A:
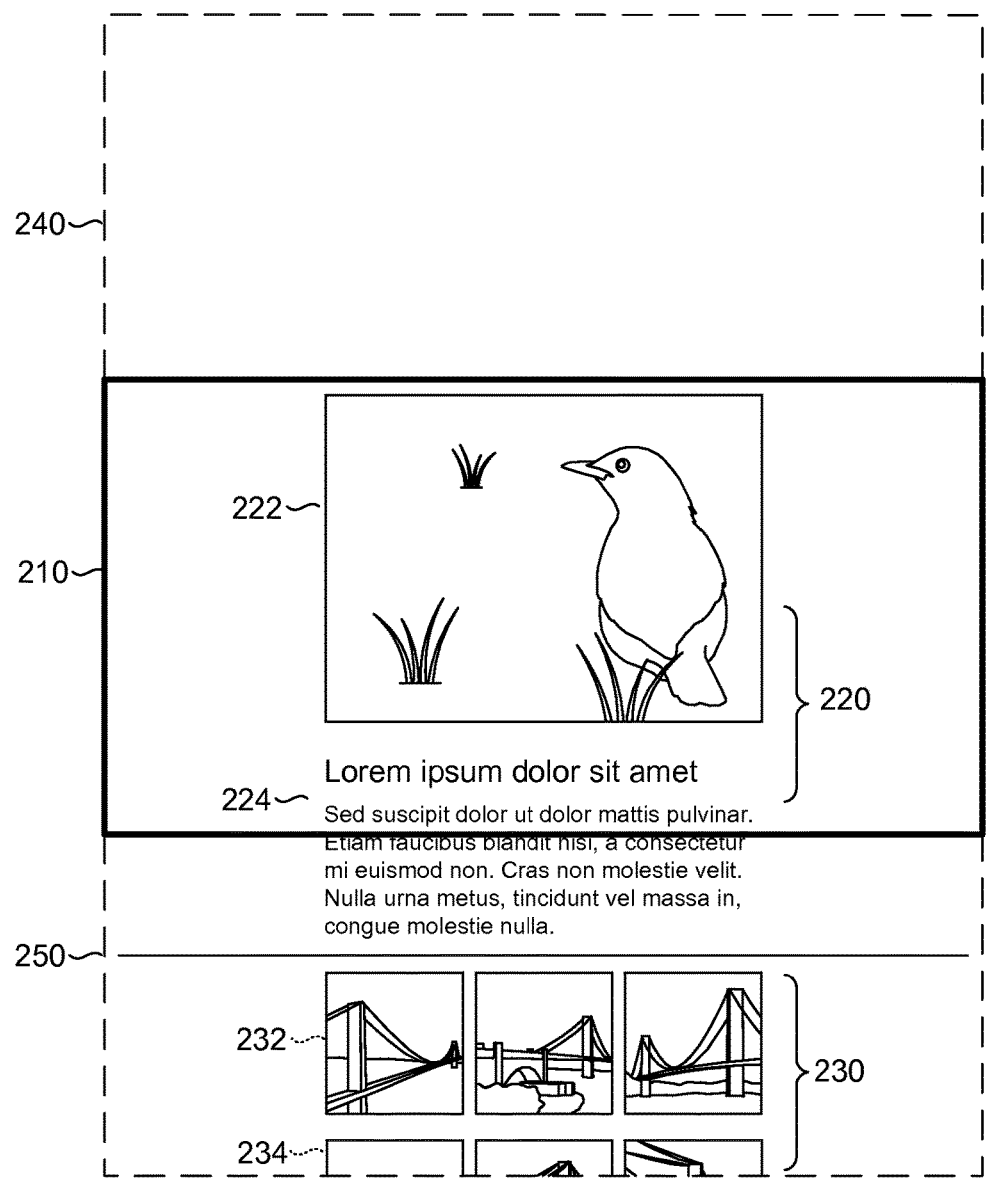
Figure 2B:
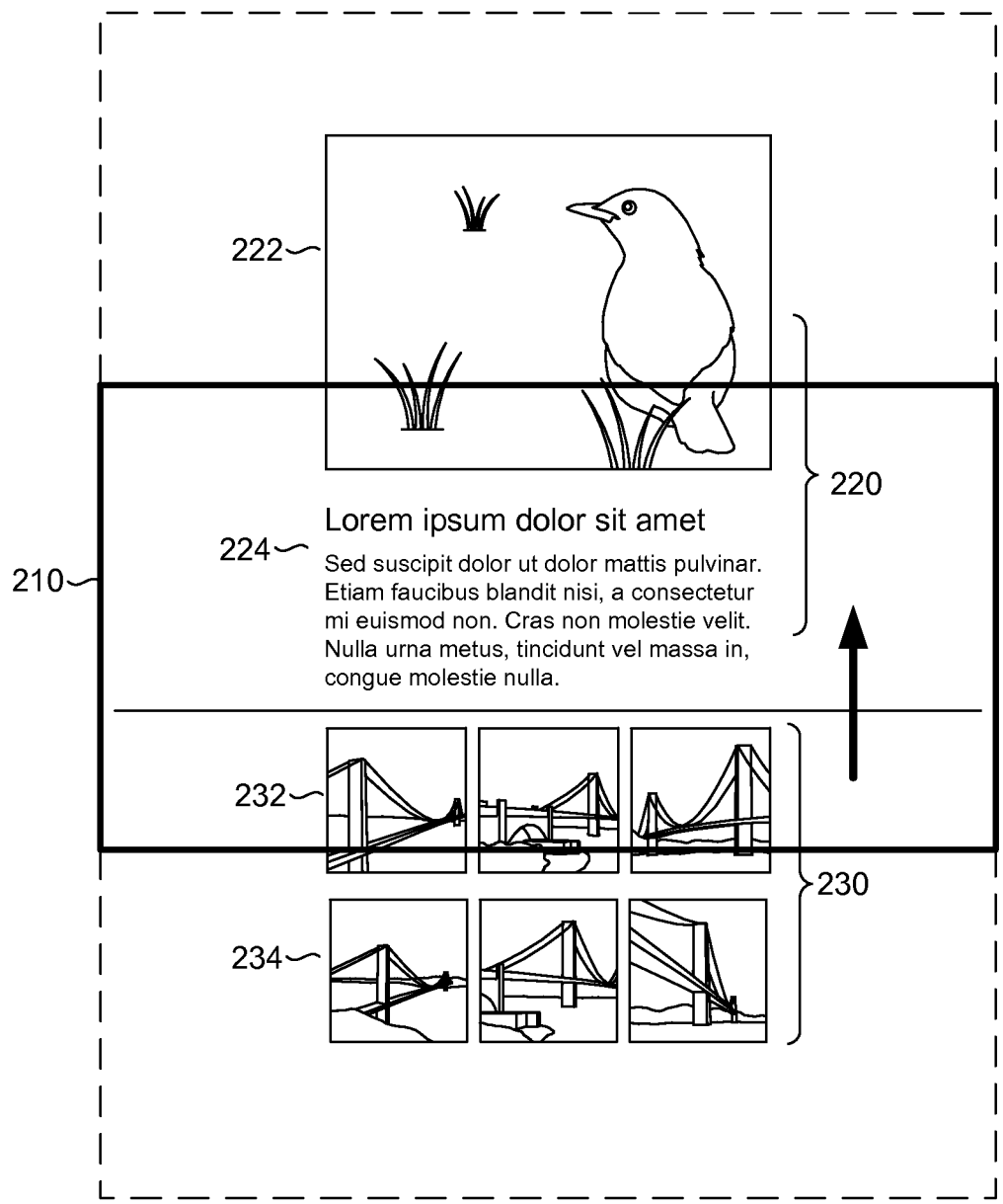

With reference now to FIGS. 2A-2B, screen shots of an exemplary viewport 210 are provided that illustrate displaying and animating sectioned content that retains fidelity across desktop and mobile device in accordance with embodiments of the present invention. As illustrated in FIG. 2A, the viewport 210 comprises the section 220 that is visible to the user. Although only a portion of content 224 is actually visible within the viewport, it is already loaded into memory enabling the user to scroll forwards or backwards efficiently as desired. Another section 230 is also loaded into memory to provide continuity as the user scrolls. Having the remainder of content 224 as well as section 230 loaded into memory prevents reloading and helps avoid rendering delay. As a user gestures for sections beyond section 230 or before section 220, a different portion of the animation timeline is played (i.e., based on a mapping of the distance in pixels the gesture travels to a portion of the timeline (e.g., number of milliseconds)). Accordingly, sections 220, 230 may be released from memory. This enables each section to be provided in full fidelity by only allocating the memory needed for the current section(s) loaded into memory and releasing cached resources for sections that are no longer in the viewport (or immediately preceding or following the current section).

As described above, as content 222, 224, 232, 234 is scrolled beyond the viewport 210 and beyond the regions 240, 250 immediately preceding or following the viewport 210, a different portion and/or a particular length in the animation timeline is played, and the section 220, 230, or content 222, 224, 232, 234, may be released from memory. For example, as the user continues to scroll forwards to view section 230 in the viewport 210, section 220 may be released from memory. Additionally, another article or section (not shown) that follows section 230 may be loaded into memory. This memory management enables a mobile device to display the article or sections in full fidelity.

Referring now to FIG. 2B, the viewport 210 depicts a user scrolling (i.e., scrubbing the timeline) forward. Content 222 is leaving the viewport 210 and content 224 is fully displayed within the viewport 210. Also, as shown, although section 230 is not fully visible within the viewport, individual rows of content 232 are being shown (while some at the bottom of content 232 and content 234 remain hidden). Similarly, the bottom of content 222 is still visible, but the top of content 222 is now hidden (i.e., partially outside of the viewport so that part of it is not visible to the user). As described above, because each section has its own internal timeline, behaviors of individual sections may cause content to be divided into chunks (e.g., rows) so triggers can be used to show/hide them depending on whether a particular chunk (e.g., row) is inside or outside the viewport, which allows more memory to be freed for the device. As the animation timeline is played (i.e., based on a user gesture or interaction), the various triggers in the internal timeline show/hide the particular rows.

Turning now to FIGS. 3A-3E, screen shots of an exemplary viewport 310 are provided that illustrate displaying and animating sectioned content that retains fidelity across desktop and mobile device in accordance with embodiments of the present invention. As shown in each of FIGS. 3A-3E, as a user interaction (e.g., a gesture) causes articles to be visible (i.e., either made the current article immediately preceding or following the current article), the article is initialized. Further, an internal timeline manages when sections come into and out of view, etc. After sections are identified within the article, an initialization handler is invoked for each section based on handlers registered in a sections registry. As noted above, these section handlers define the behaviors and animations used within a particular section. Additionally, these section handlers are responsible for adding internal section animations/behaviors to the article timeline. All sections of the article are initialized at once so the article handler can get a complete picture of all the sections, their internal timelines, etc., that the article handler must manage and synchronize together to perform the expected behaviors. By delaying invoking the initialization until the article is visible, memory is preserved and initialization time is reduced.

With reference initially to FIG. 3A, a viewport 310 currently provides article 330. Articles 320, 340 are loaded into memory and awaiting a user interaction to move them into the visible area of the viewport 310. As a user gestures for an article other than article 330, a different portion of the animation timeline is played (i.e., based on a mapping of the distance in pixels the gesture travels to a portion of the timeline (e.g., number of milliseconds)). Accordingly, articles 320, 340 may be released from memory (depending on which article the user gestures for). This enables each article to be provided in full fidelity by only allocating the memory needed for the current article(s) loaded into memory and releasing cached resources for articles that are no longer in the viewport (or immediately preceding or following the current article). As shown in FIG. 3A, the article 350 following article 340 has not yet been loaded into memory.

Figure 3B:
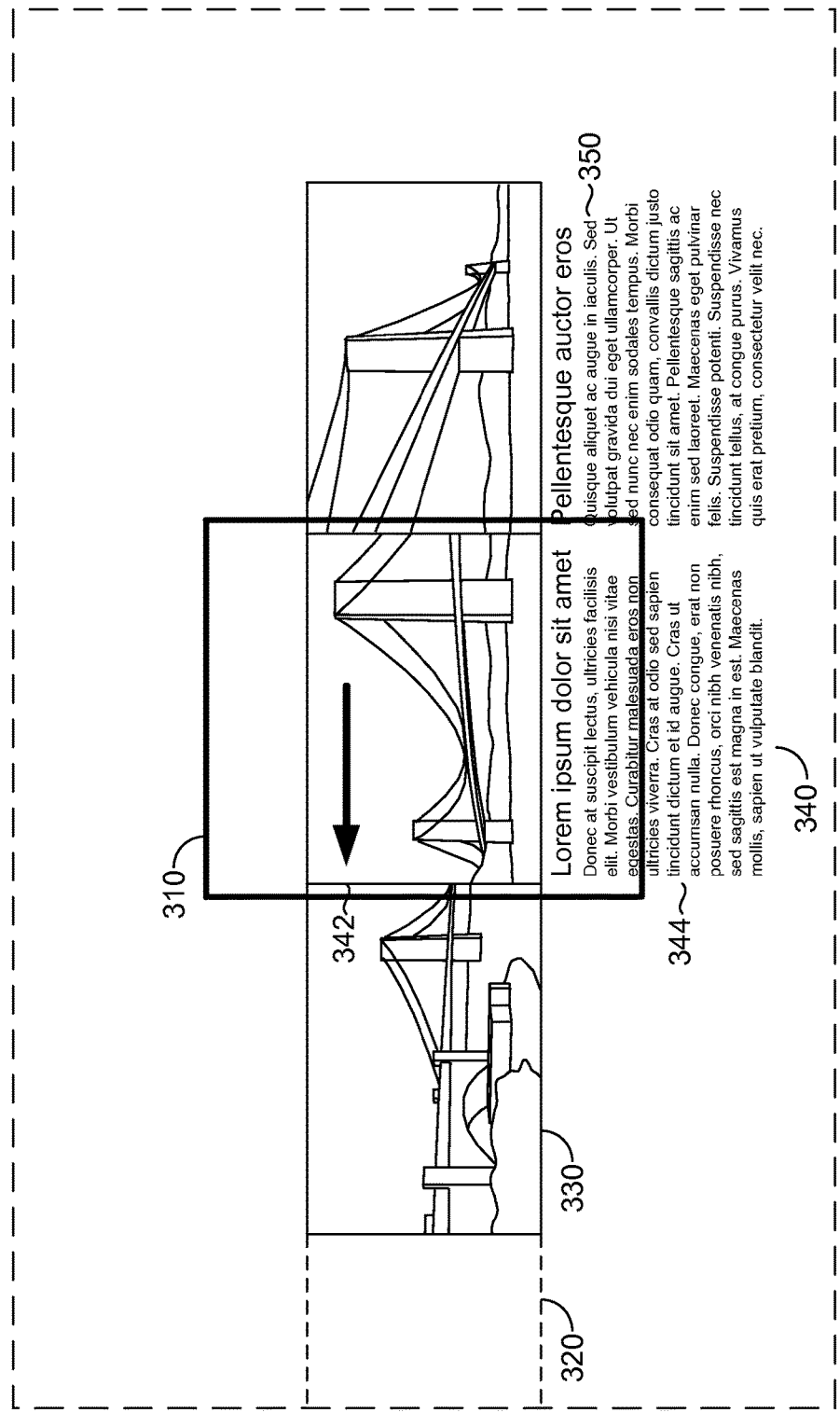

In FIG. 3B, the user is scrolling horizontally from right to left. Again, this causes a different portion of the animation timeline to be played (i.e., based on the mapped distance in pixels the user scrolled). Now article 340 is visible in the viewport 310 and article 320 has been released from memory. As shown, article 340 contains sections 342, 344 (as well as another section that is not yet visible). Articles 330, 350 remain loaded into memory in case the user scrolls horizontally in either direction.

Figure 3C:
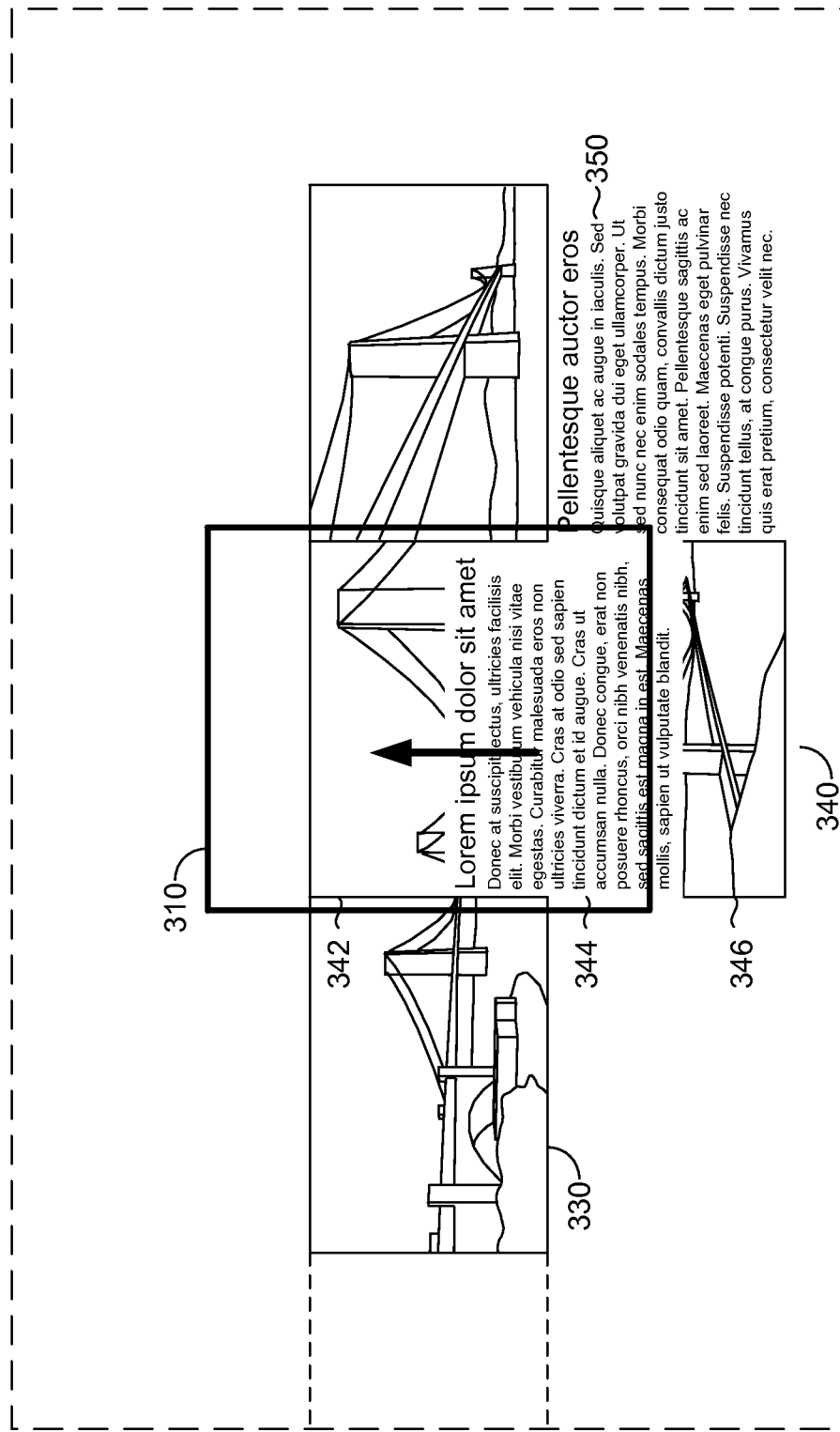
Figure 3D:
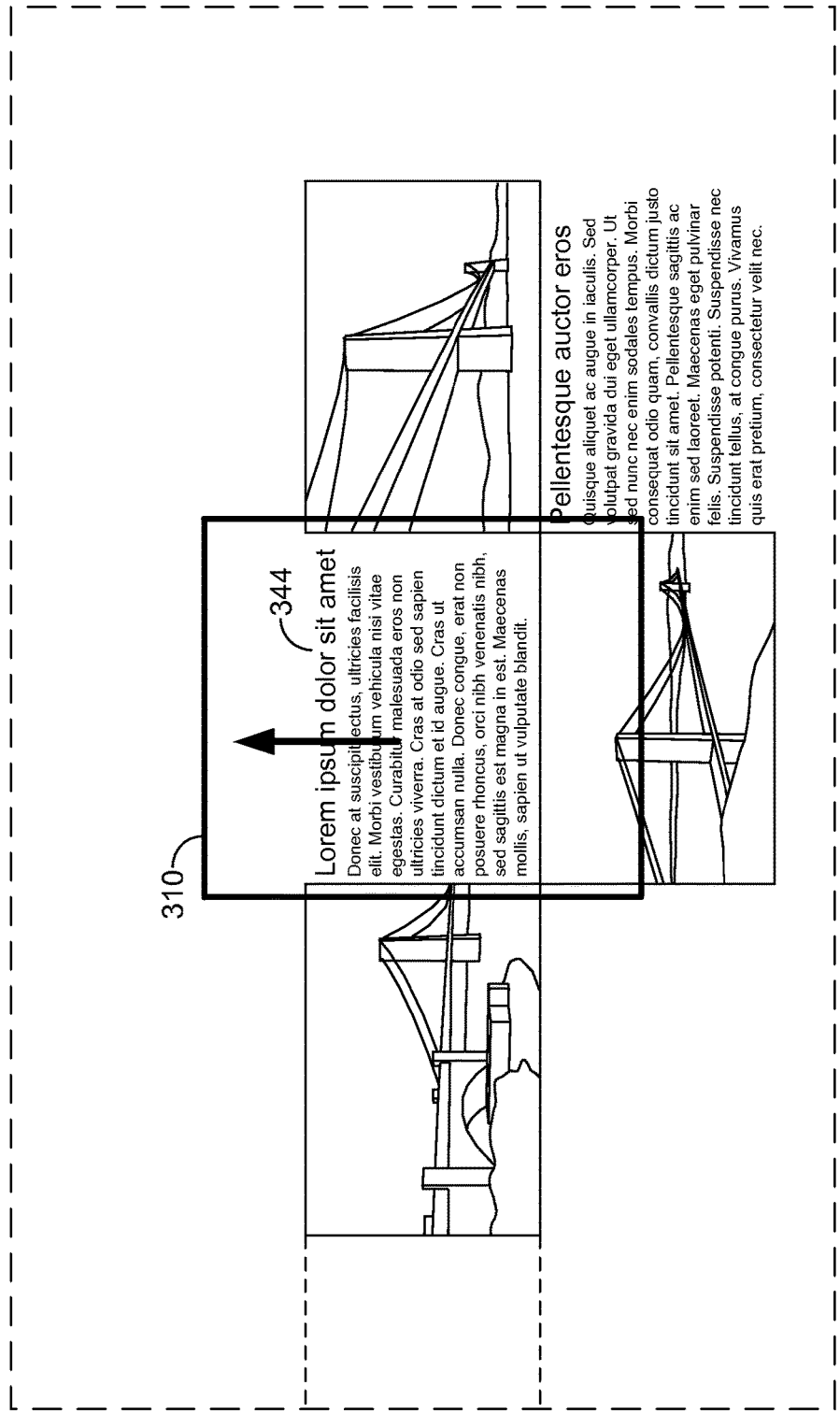
Figure 3E:
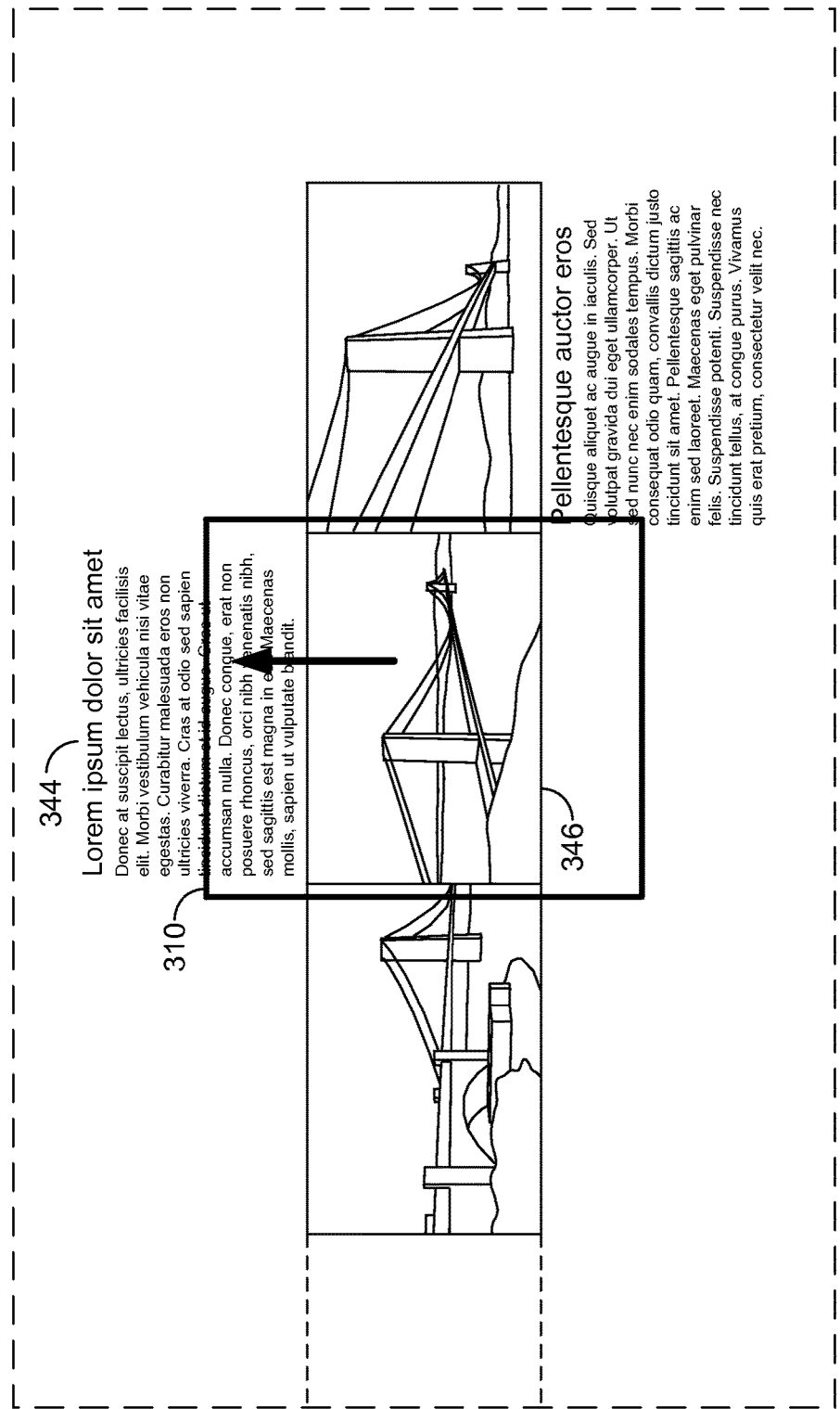

Referring now to FIG. 3C, the user begins scrolling vertically from bottom to top. Articles 330, 350 remain loaded into memory in case the user scrolls horizontally in either direction. However, section 342 is partially hidden from view as section 344 moves into the viewport. As shown in FIG. 3D, as section 344 becomes fully visible in the viewport 310, section 342 is fully hidden (and no longer shown in FIG. 3D) by section 344. Turning now to FIG. 3E, as the user continues to scroll upwards, section 346 enters the viewport 310 and section 344 exits the viewport 310. These differences in behaviors are defined by the section behaviors that are triggered based on the portion and length of timeline being played. By delaying certain behaviors or loading only the visible sections, the memory of the device used to view the articles can be preserved.

Figure 4:
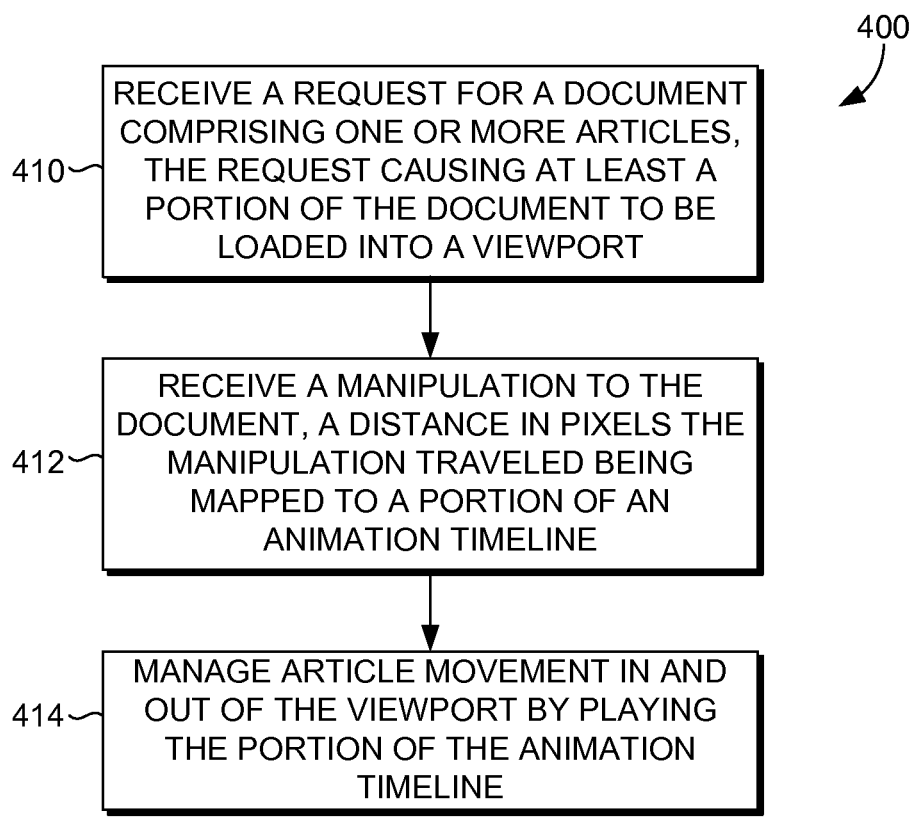

Referring next to FIG. 4, a flow diagram is provided that illustrates a method 400 for displaying and animating sectioned content that retains fidelity across desktop and mobile devices with an embodiment of the present invention. Each block of the method 400 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. For example, the method 400 may be provided as part of an animation system, such as the animation system 100 of FIG. 1.

As shown at step 410, a request for a document comprising one or more articles is received. The request causes at least a portion of an article to be loaded into a viewport, such as by publication viewer 114 of FIG. 1. In some embodiments, an animation timeline is identified for the article. Each section in the one or more articles may also be identified, such as by animation engine 118 of FIG. 1. Behaviors for each article or section of an article are identified. An internal timeline may also identified for each section and is placed inside the animation timeline in a manner that causes the internal timeline to execute as each section starts to enter the viewport.

In some embodiments, the article is created by a user and shared as a link. Upon selection, the article appears to other users as an HTML page. The animation timeline defines article behaviors. Each section may have defined behaviors, such as in a sections article. These behaviors include attributes that cause the article or sections within the article to be presented in a particular manner. For example, the behaviors can cause the viewport to present the article as a table of contents or as a 50/50 behavior (text on left side of article, image on right side of article). The behaviors may cause portions of the article to appear as if the portions are zooming in or out or fading in or out. As can be appreciated, many different behaviors can be attached to an article or section of an article by the user creating the article.

In some embodiments, the articles that are loaded into memory is managed, such as by publication viewer 114 of FIG. 1. Although only one article at a time may be visible in the viewport, in some embodiments, the current article that is visible as well as the article immediately preceding and following the current article are loaded into memory. In this way, when these articles are animated (i.e., moved) into view, they do not have to be reloaded and there is no rendering delay. In some embodiments, a visual cue that articles are available that precede and follow the current article is provided. This may be accomplished if the current article does not fill up the entire viewport so at least a partial representation of the preceding and following article is provided. Further, behaviors are attached to articles as they are loaded into memory. This is accomplished by utilizing the internal timeline so that as each section is loaded into memory and starts to enter the viewport, the behaviors for each section are attached. Behaviors may be recalculated and reattached during dynamic resizing of the viewport (e.g., due to layout changes).

At step 412, a manipulation to the viewport is received. The manipulation is received via a user interaction with a viewport scroll bar or with the viewport itself (i.e., a vertical swipe). Although FIG. 4 is described with respect to manipulating the viewport to switch between articles, it is contemplated that the same principles apply with respect to manipulating the viewport to scrub through the sections of an article (i.e., a horizontal swipe). As the viewport is manipulated, the articles that are loaded into memory are changed. This also causes cached resources for an article leaving the viewport to be released (or in some embodiments, when an article is no longer the current article or the article immediately preceding or following the current article). By only allocating the memory needed for the article(s) that is currently loaded into memory and releasing cached resources for articles that are no longer in the viewport (or immediately preceding or following the current article), the document can be rendered, at step 414, in full fidelity regardless of device type for a device initiating the request.

In some embodiments, articles are kept visible off screen (i.e., outside the viewport or underneath an article being presented within the viewport) if there is enough remaining memory to keep the article in memory. If there is not enough memory to keep the article in memory, the article is removed from memory.

In some embodiments, the movement of any sections within an article at any given time is synchronized without having to measure elements or figure out where the elements are relative to the viewport during each scroll event. Use of the animation timeline means the scroll events are tied to the timeline and not any measured distance. In other words, each pixel-length is the equivalent of a millisecond in the timeline. As the user manipulates the viewport via some type of gesture or interaction, sections of an article may be moved through the viewport. However, the distance a particular section moves does not correspond to the distance/height of the article. Instead the distance a particular section moves corresponds to the length of the timeline of the current article. In other words, the distance in pixels the gesture travels is equal to a portion of the timeline (e.g., the number of milliseconds that should be played in the timeline).

Figure 5:
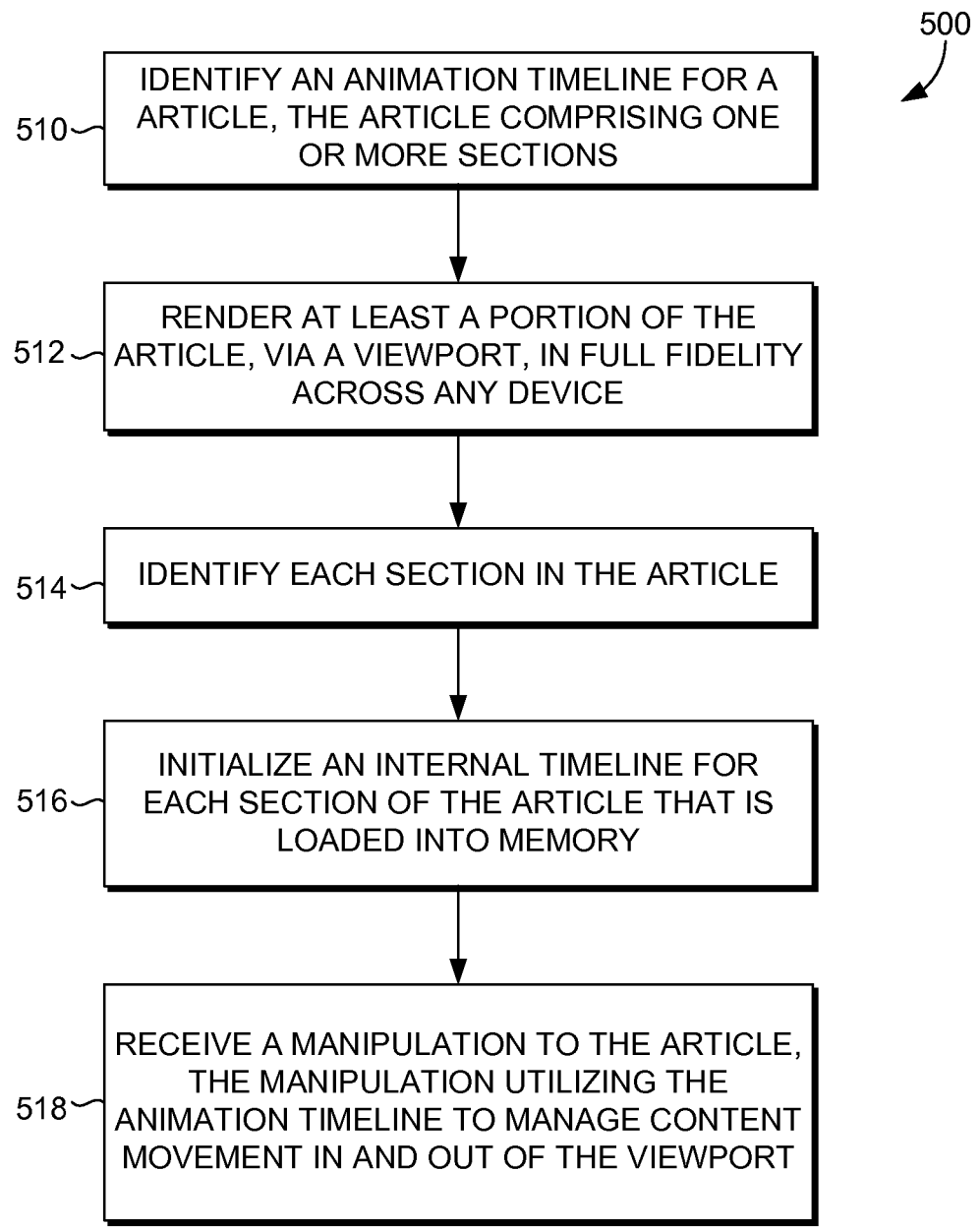

Referring now to FIG. 5, a flow diagram is provided that illustrates a method 500 for displaying and animating sectioned content that retains fidelity across desktop and mobile devices with embodiments of the present invention. Each block of the method 500 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. For example, the method 500 may be provided as part of an animation system, such as the animation system 100 of FIG. 1.

As shown at step 510, an animation timeline is identified for an article that comprises one or more sections. At least a portion of the article is rendered via the viewport, at step 512, in full fidelity across any device. In some embodiments, at least a portion of the article that is loaded into memory is visible within the viewport. In some embodiments, each of the sections immediately preceding and immediately following the section of the article that is currently visible within the viewport are also loaded into memory. In some embodiments, cached resources are released for a section as it leaves the viewport. For example, as the user scrubs through an article, sections that are no longer in the viewport (or on either side of the section currently visible in the viewport) are released from memory. This frees resources of the device so that each article can be presented in full fidelity even if the user is utilizing a mobile device.

Each section in the one or more articles is identified, at step 514, and may include behaviors for each section. These behaviors may be defined in an internal timeline that is initialized, at step 516, when the article is loaded into memory. In embodiments, the behaviors comprise various attributes that affect how the content of a section is presented to a user. For example, the behaviors may include zooming in/out, fading in/out, or how the content of a section is laid out.

A manipulation to the viewport is received at step, 518. The manipulation utilizes the animation timeline (which may include one or more internal timelines nested within the animation timeline) to manage section movement in and out of the viewport. In some embodiments, the movement of any content within a section is synchronized at any given time without having to measure elements or figure out where the elements are relative to the viewport during each manipulation of the viewport. Because manipulations are tied to the timeline and not any measured distance, each pixel-length is the equivalent of a millisecond in the timeline. Thus, the distance in pixels a gesture travels is equal to the number of milliseconds that should be played in the timeline. This prevents size of content within a section from being an issue when displaying the section in full fidelity on a mobile device.

In some embodiments, in addition to managing content movement, content visibility is also managed to release resources. For example, in a photograph grid, sections are utilized to show/hide/release resources for photographs in rows of the grid that are no longer visible. Similarly, content visibility can be managed for hiding images in long text sections that have scrolled out of the viewport. In various embodiments, there are three levels of showing/hiding that occurs to release resources: 1) at the article level, articles that are not current or preceding or following the current article are hidden (this is managed by a document level timeline); 2) at the section level, sections that are outside of the viewport are hidden to release all their resources (this is managed by the article timeline); and 3) at the content level, content that is outside of the section viewport may be hidden to release resources (this is managed by the internal section timeline).

Figure 6:
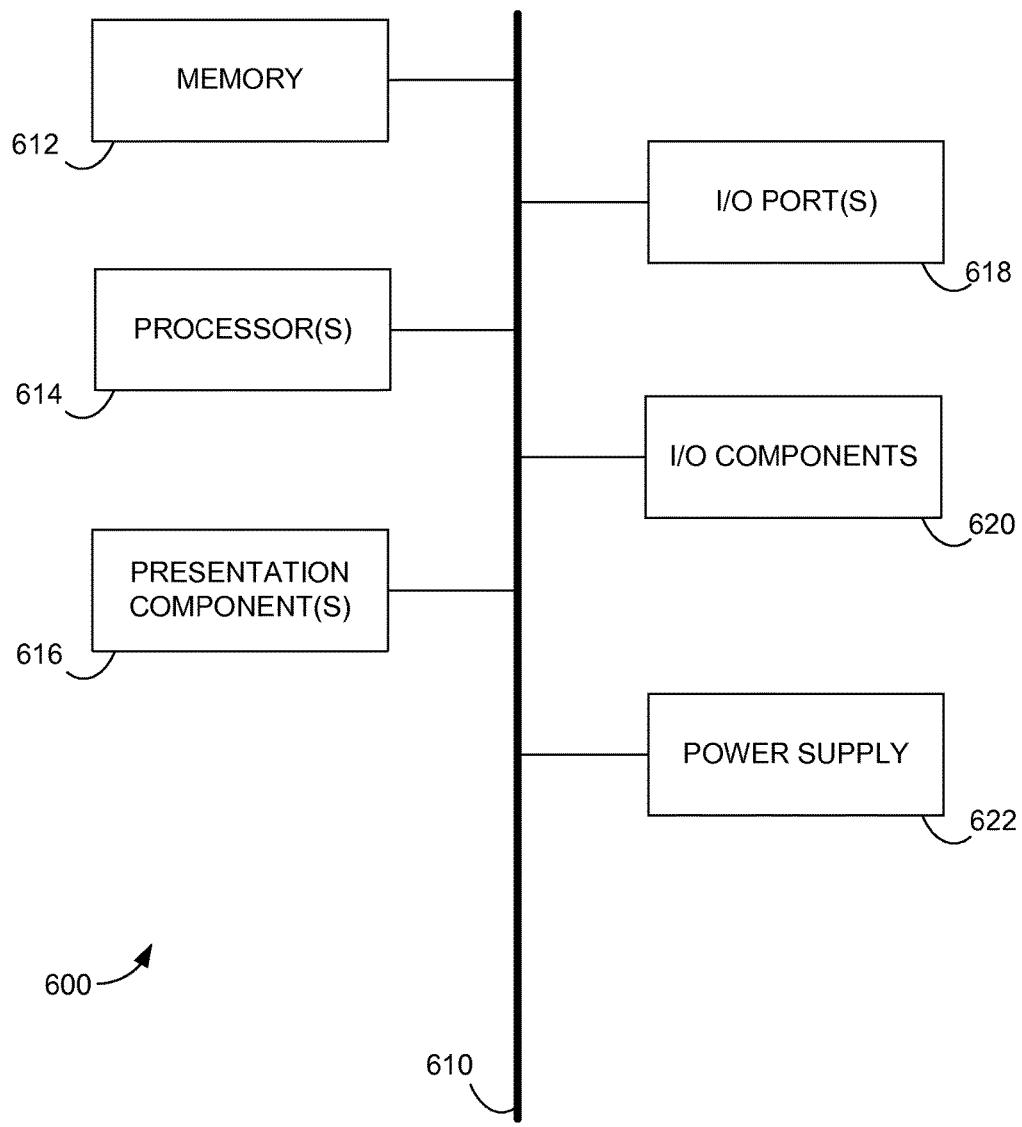

Having described embodiments of the present invention, an exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output (I/O) ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as, stereoscopic camera systems, infrared camera systems, RGB camera systems, and combinations of these for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

As can be understood, embodiments of the present invention facilitate displaying and animating sectioned content that retains fidelity across desktop and mobile devices. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A non-transitory computer storage media storing computer-useable instructions that, when used by one or more computing devices, cause the one or more computing devices to perform operations comprising:
receiving a request from a user device for a document comprising one or more articles, the request causing at least a portion of the document to be loaded into a viewport;
receiving a manipulation to the document, the manipulation being associated with a distance in pixels the manipulation traveled;
accessing an animation timeline mapping the distance to a time duration in the animation timeline, wherein the animation timeline defines adjustments over time to CSS properties of content elements of a first of the one or more articles, wherein the time duration spans from a first point with a first set of values of the CSS properties to a second point with a second set of values of the CSS properties, wherein at least one of the first point or the second point is between a start point and an end point of the animation timeline; and
triggering, by the animation timeline, corresponding ones of the adjustments to update the CSS properties from the first set of values to the second set of values in the viewport during the manipulation.

2. The computer storage media of claim 1, wherein the corresponding adjustments to the CSS properties comprise a triggered animation independent from speed of the manipulation.

3. The computer storage media of claim 1, wherein the corresponding adjustments to the CSS properties comprise a scrubbed animation controlled by speed of the manipulation.

4. The computer storage media of claim 1, wherein the operations additionally comprise identifying an internal timeline for each section in the one or more articles.

5. The computer storage media of claim 4, wherein the operations additionally comprise initializing behaviors for each internal timeline when one of the one or more articles starts to enter the viewport.

6. The computer storage media of claim 1, wherein the operations additionally comprise:
managing which of the one or more articles are loaded into memory; and
changing which of the one or more articles are loaded into memory as the viewport is manipulated.

7. The computer storage media of claim 1, wherein the operations additionally comprise initializing a behavior to the one or more articles as they are loaded into memory.

8. The computer storage media of claim 4, wherein each section of a particular article has a different behavior.

9. The computer storage media of claim 6, wherein the corresponding adjustments to the CSS properties comprise an adjustment to at least one of opacity, color, scaling or font of one of the content elements.

10. The computer storage media of claim 9, wherein the operations additionally comprise releasing cached resources for one of the one or more articles as it leaves the viewport.

11. The computer storage media of claim 1, wherein the operations additionally comprise:
determining there is enough memory to keep one of the one or more articles in memory; and
keeping the article in memory off screen.

12. The computer storage media of claim 1, wherein the operations additionally comprise:
determining there is not enough memory to keep one of the one or more articles in memory; and
removing the article from memory.

13. The computer storage media of claim 1, wherein the corresponding adjustments to the CSS properties comprise a translation of one of the content elements and a simultaneous adjustment to at least one of opacity, color, scaling or font of the content element.

14. The computer storage media of claim 1, wherein the corresponding adjustments comprise at least one adjustment to a CSS property of a class of the content elements.

15. A computerized method for displaying and animating sectioned content, the computerized method comprising:
accessing an animation timeline for an article, the article comprising one or more sections;
rendering at least a portion of the article, via a viewport;
identifying each section in the article;
initializing an internal timeline for one of the sections of the article that is loaded into memory, wherein the internal timeline defines adjustments over time to style properties of content elements of the section;
receiving a manipulation to the article, the manipulation being associated with a distance in pixels the manipulation traveled;
mapping the distance to a time duration in the internal timeline, wherein the internal timeline defines adjustments over time to the style properties of the one of the sections of the article, wherein the time duration spans from a first point with a first set of values of the style properties to a second point with a second set of values of the style properties, wherein at least one of the first point or the second point is between a start point and an end point of the internal timeline; and
for all of the content elements in the viewport, animating movement of the content elements by triggering, by the internal timeline, corresponding ones of the adjustments to update the style properties from the first set of values to the second set of values in the viewport during the manipulation.

16. The computerized method of claim 15, further comprising releasing cached resources for each section as it leaves the viewport.

17. The computerized method of claim 15, wherein the corresponding adjustments to the style properties comprise a triggered animation independent from speed of the manipulation.

18. The computerized method of claim 15, wherein the corresponding adjustments to the style properties comprise a scrubbed animation controlled by speed of the manipulation.

19. The computerized method of claim 15, wherein the corresponding adjustments comprise at least one adjustment to a style property of a class of the content elements.

20. A computerized system comprising:
one or more processors; and a non-transitory computer storage media storing computer-useable instructions that, when used by the one or more processors, cause the one or more processors to:

access an animation timeline for an article, the article comprising one or more sections, wherein the animation timeline includes an internal timeline for each section within the document;

receive a manipulation to the article, the manipulation being associated with a distance in pixels the manipulation traveled;

map the distance to a time duration in the animation timeline, wherein the animation timeline defines adjustments over time to style properties of content elements of a first of the one or more articles, wherein the time duration spans from a first point with a first set of values of the style properties to a second point with a second set of values of the style properties, wherein at least one of the first point or the second point is between a start point and an end point of the animation timeline; and cause the animation timeline to animate the content elements in the viewport by scrubbing the time duration of the animation timeline to control trigger corresponding ones of the adjustments in the viewport during the manipulation, wherein the corresponding adjustments comprise a beginning and an end, wherein the beginning corresponds to the first set of values and the end corresponds to the second set of values.

* * * * *